US009202019B2

(12) United States Patent
Xiao et al.

(10) Patent No.: US 9,202,019 B2
(45) Date of Patent: Dec. 1, 2015

(54) PROGRAM SERVICE BASED ON INDIVIDUAL IDENTIFICATION

(75) Inventors: Hong Xiao, Acton, MA (US); Jian Huang, Sudbury, MA (US); Guillermo Ortiz, Woburn, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 75 days.

(21) Appl. No.: 13/556,543

(22) Filed: Jul. 24, 2012

(65) Prior Publication Data

US 2014/0033277 A1 Jan. 30, 2014

(51) Int. Cl.
*G06F 7/04* (2006.01)
*G06F 21/10* (2013.01)

(52) U.S. Cl.
CPC .................................... *G06F 21/10* (2013.01)

(58) Field of Classification Search
CPC ...................................................... G06F 21/10
USPC ............................................................. 726/4
See application file for complete search history.

(56) References Cited

U.S. PATENT DOCUMENTS

| | | | | |
|---|---|---|---|---|
| 5,291,554 | A * | 3/1994 | Morales | 380/211 |
| 7,689,556 | B2 * | 3/2010 | Garg et al. | 707/765 |
| 2005/0071459 | A1 * | 3/2005 | Costa-Requena et al. | 709/224 |
| 2010/0178864 | A1 * | 7/2010 | Chow et al. | 455/3.06 |
| 2010/0279674 | A1 * | 11/2010 | Zou et al. | 455/419 |
| 2012/0096499 | A1 * | 4/2012 | Dasher et al. | 725/87 |
| 2012/0291060 | A1 * | 11/2012 | Relyea et al. | 725/25 |
| 2012/0309353 | A1 * | 12/2012 | Markov et al. | 455/411 |

* cited by examiner

*Primary Examiner* — Mohammad W Reza

(57) ABSTRACT

Method, device, and storage medium for providing a program service based on identifying a user at a user level versus at an account level or a device level. The user is identified based on an identifier associated with a mobile device. The program service allows the user to store program session information according to various user settings including location, time of day, user device used during previous session, type of program, and service provider that provides access to the program service. The program service allows the user to share program session information with other users or prevent other users from accessing the program session information. The program service provides digital rights management at the user level.

20 Claims, 9 Drawing Sheets

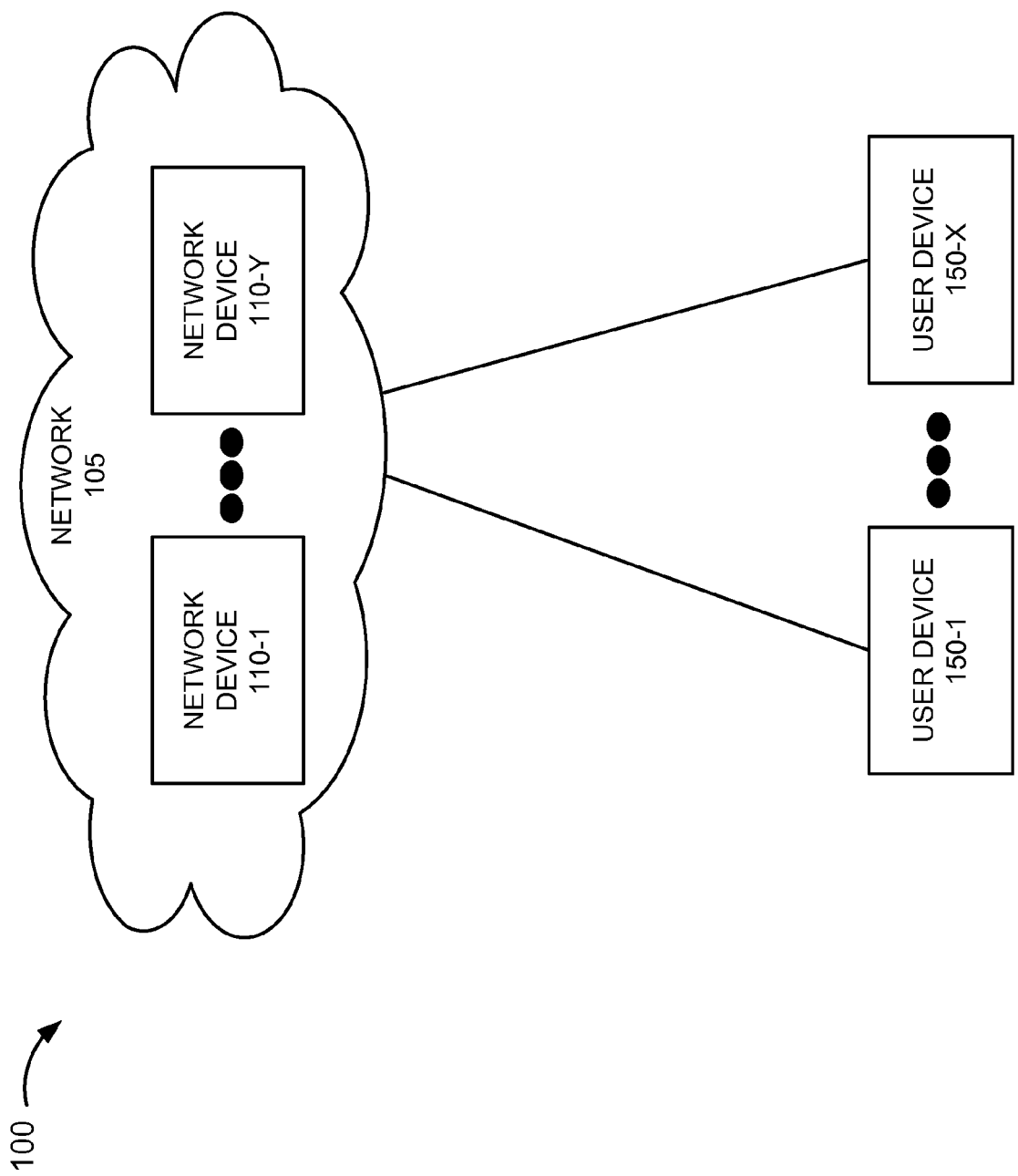

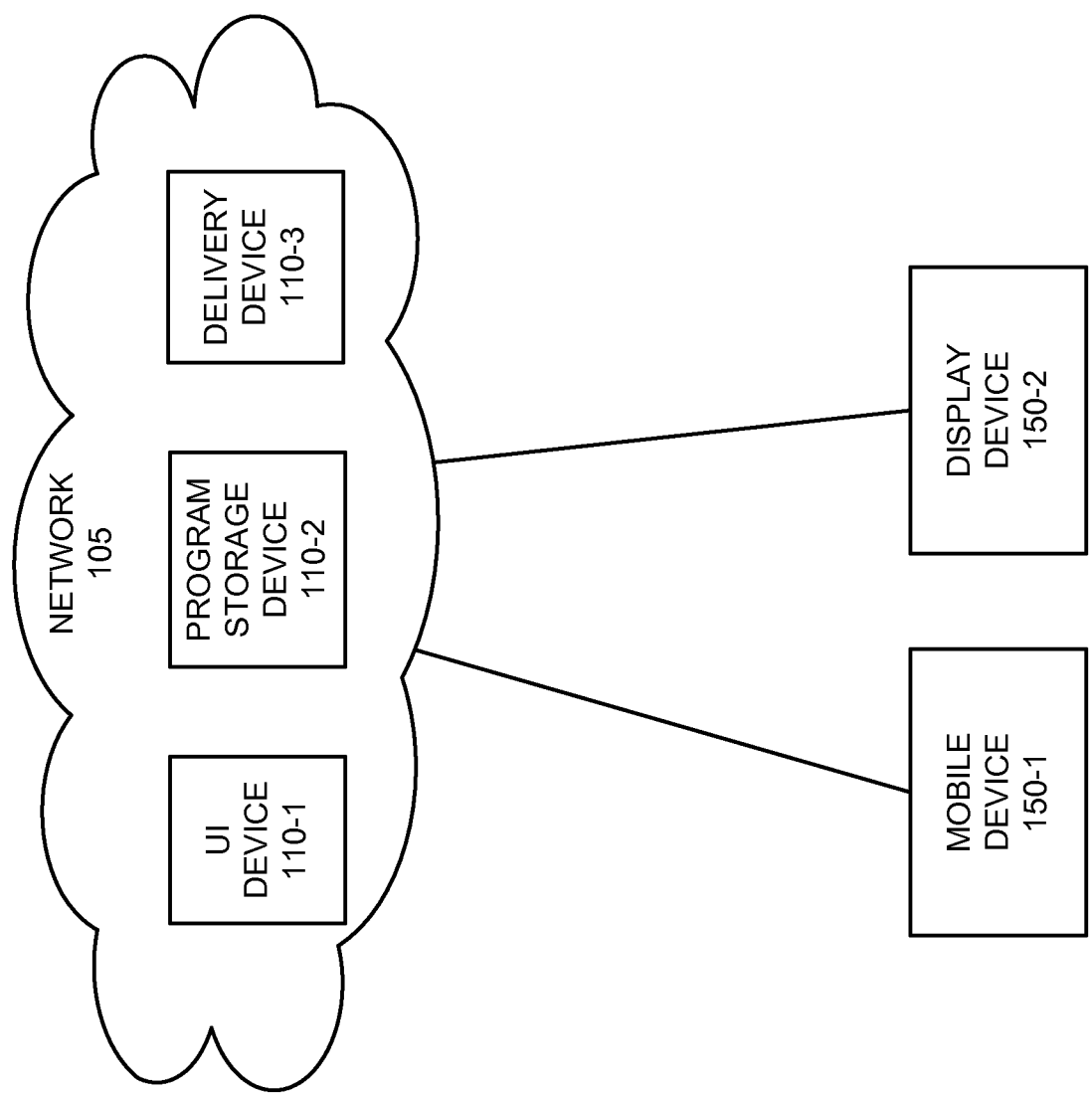

PROGRAM SERVICE BASED ON INDIVIDUAL IDENTIFICATION

BACKGROUND

Users access various types of multimedia content via various user devices, such as mobile devices and stationary devices. Some multimedia content is accessed based on accounts that are shared by numerous individuals. For example, in a family setting, a Netflix® account may be used by various family members to access movies. Each family member may see the movie selections made by other family members.

DESCRIPTION OF THE DRAWINGS

FIG. 1A is a diagram illustrating an exemplary environment in which an exemplary embodiment of a multimedia system may be implemented;

FIG. 1B is a diagram illustrating exemplary elements for the devices illustrated in FIG. 1A;

DETAILED DESCRIPTION OF PREFERRED EMBODIMENTS

Figure 2:
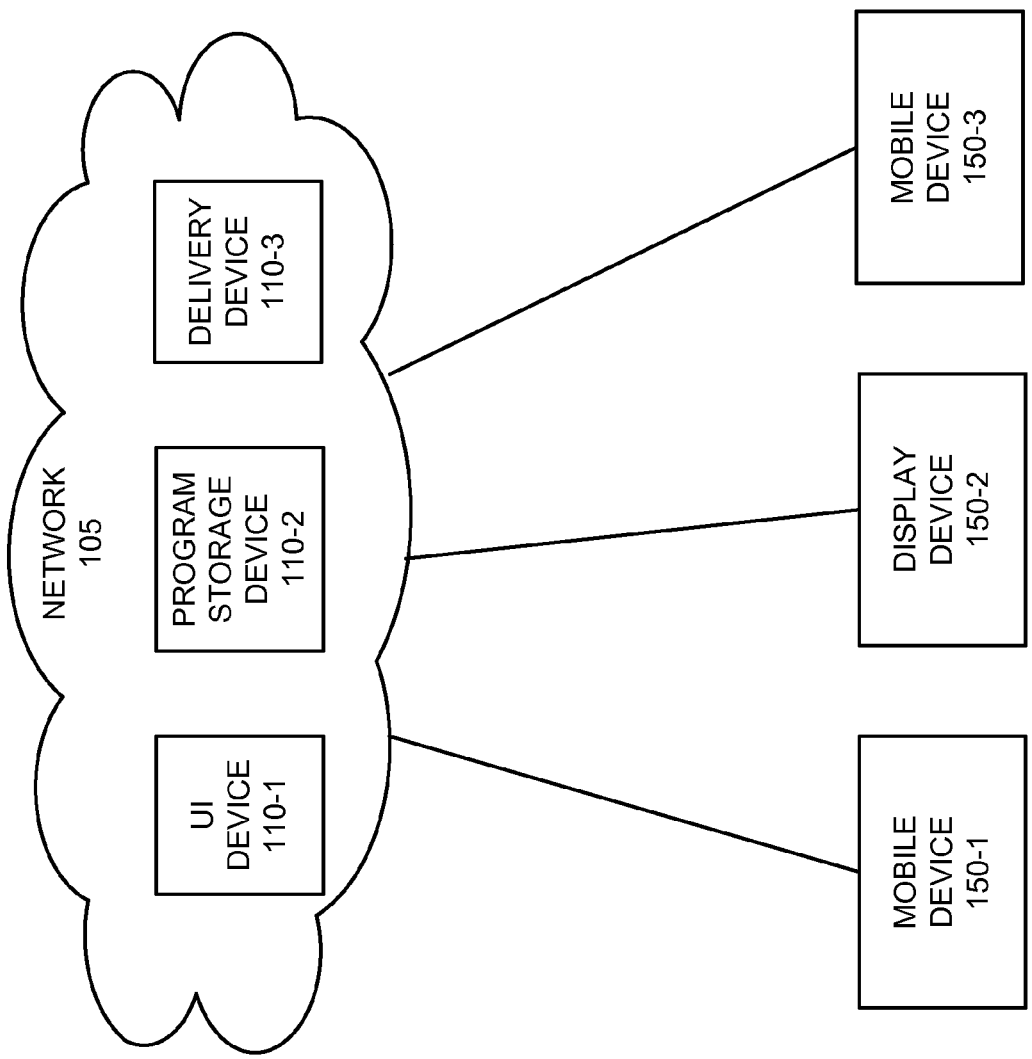
FIG. 2 is a diagram illustrating the multimedia system in accordance with an exemplary scenario.

The following detailed description refers to the accompanying drawings. The same reference numbers in different drawings may identify the same or similar elements.

The term "program," as used herein, is intended to include various types of multimedia content and digital content. For example, a program may include audio content, visual content, audio and visual content. By way of further example, a program may be a movie, a song, a game, images or photos, digital video recorded (DVR) content, or the like. A program may be made from a third party or user content. According to an exemplary embodiment, each program is assigned a unique identifier.

According to an exemplary embodiment, a multimedia system provides access to and use of programs by users. According to an exemplary embodiment, the multimedia system identifies a user. According to an exemplary implementation, the user is identified based on his/her user device or a service associated with the user device. For example, a user identifier may be implemented as a mobile telephone number, an equipment identifier (e.g., a Media Access Control (MAC) address, a Mobile Equipment Identifier (MEID), an International Mobile Equipment Identity (IMEI), an Electronic Serial Number (ESN), etc.), or some other type of unique identifier (e.g., International Mobile Subscriber Identity (IMSI), etc.) pertaining to the user device. This is in contrast to existing systems in which access to and use of programs are performed at an account level. According to an exemplary embodiment, the user device is a mobile device (e.g., a mobile telephone) on which the user identifier is based.

According to an exemplary embodiment, the multimedia system performs digital rights management at an individual level versus an account level or a device level. For example, the digital rights management is based on the user identifier. Digital rights management includes copyright management.

According to an exemplary embodiment, the multimedia system provides universal program session shifting. For example, a user may continue to watch a program from a previous session, anytime and anywhere, and via different access service providers (e.g., Verizon, Comcast, Time Warner, Dish Network, etc.). According to an exemplary embodiment, the universal program session shifting is provided at a user level (i.e., an individual level). This is contrast to other well-known techniques in which session shifting is provided at an account level and allows multiple users sharing the account to have knowledge of what programs have been partially used by each user, etc.

According to an exemplary embodiment, the multimedia system allows a user to select a criterion in which a previous session (e.g., program session information) is stored. According to an exemplary implementation, the user may save the previous session based on the location of the user, the time of day and/or calendar information (e.g., day of week, month, year, etc.), the user device used during the session, the type of program, the service provider used to access the multimedia system, the format of the program, or some combination thereof. According to an exemplary embodiment, the multimedia system allows the user other session-saving options. For example, the multimedia system may automatically save a session, not save a session, only save the last session, or prompt the user as to whether to save the session.

According to an exemplary embodiment, the multimedia system allows a user to share a previous session with another user. According to an exemplary implementation, the other user accessing the previous session uses an authorization token to access the program session information. The multimedia system verifies the authorization token and prevents or allows the other user to use the program session information depending on the validity of the authorization token. According to an exemplary embodiment, the multimedia system allows a user to access and use his/her own program session information. According to another exemplary embodiment, the multimedia system stores program session information.

According to an exemplary embodiment, a user device includes a multimedia system component to access and use the multimedia system. For example, the multimedia system component may be implemented as an agent or a client. According to an exemplary embodiment, a user device may act as a proxy to the multimedia system on behalf of another user device. For example, a user may have a mobile phone device that acts as a proxy between the multimedia system and a television that is used to provide a program to the user.

According to an exemplary embodiment, access and use of the multimedia system is based on an automatic log-in procedure that does not require the user to enter log-in information. According to an exemplary implementation, the multimedia system component of a mobile device automatically detects the presence of a multimedia system component of a television or some other user device, and a connection between the user devices is automatically established. According to an exemplary implementation, the multimedia system component of the mobile device initiates an automatic log-in by establishing a connection to the multimedia system and providing the user identifier. Upon successful completion of the log-in, the user is logged into the multimedia system at an individual level. According to another exemplary implementation, the user initiates the log-in. According to an exemplary embodiment, the multimedia system component initiates a program service session in response to various user inputs. For example, the user input may include physical contact between two user devices (e.g., tapping the mobile telephone against the television), an auditory command (e.g., the user clapping his/her hands, a voice command, etc.), pressing a button or other user input (e.g., via a user interface) on the user device. In this way, the initiation of a program service session may be automatic or user-initiated.

According to an exemplary embodiment, the multimedia system component selects a user identifier for providing a program service based on signal strength. For example, multiple users of the multimedia system may each carry a mobile device (e.g., a mobile telephone) that includes the multimedia system component. When both users are close to another device (e.g., a television) that includes the multimedia system component, the multimedia system component of the television selects the user identifier for providing the program service based on the signal strength. For example, the multimedia system component of the television measures and compares the signal strength pertaining to communications between the television and each of the mobile devices. According to an exemplary embodiment, the multimedia system component selects the user identifier based on a user input via a user interface, user settings, or a combination thereof.

While exemplary embodiments provided in this description may be implemented based on the use of a particular network architecture, platform, device, etc., such implementations are not intended to be restrictive or provide an exhaustive treatment, as such. In other words, the embodiments described herein may be implemented using other suitable network architectures, platforms, devices, etc., which may not be specifically described.

FIG. 1A is a diagram illustrating an exemplary environment in which an exemplary embodiment of the multimedia system may be implemented. As illustrated, an environment 100 includes a network 105. Network 105 includes network devices 110-1 through 110-Y, in which Y>1 (also referred to collectively as network devices 110 and individually as network device 110). Environment 100 also includes user devices 150-1 through 150-X, in which X>1 (also referred to collectively as user devices 150 and individually as user device 150).

The number of devices and networks, and the configuration in environment 100 are exemplary. According to other embodiments, environment 100 may include additional devices, fewer devices, different devices, and/or differently arranged devices, than those illustrated in FIG. 1A. Additionally, or alternatively, environment 100 may include an additional network and/or a differently arranged network, than those illustrated in FIG. 1A.

According to other embodiments, a single device in FIG. 1A may be implemented as multiple devices. Alternatively, for example, multiple devices in FIG. 1A may be implemented as a single device. For example, multiple devices of network devices 110 may be implemented as a single device. A device may be implemented according to one or multiple network architectures (e.g., a client device, a server device, a peer device, a proxy device, or a combination thereof).

Also, according to other embodiments, one or more functions and/or processes described as being performed by a particular device may be performed by a different device, or some combination of devices, which may or may not include the particular device.

Environment 100 may be implemented to include wired and/or wireless connections among the devices and network illustrated. A connection may be direct or indirect and may involve intermediary device(s) and/or network(s) not illustrated in FIG. 1A. Additionally, the number and the arrangement of connections between the devices and the network are exemplary.

Network 105 includes a network that provides access to and use of programs by users. For example, network 105 may be implemented as a part of the Internet and/or other types of networks. For example, users may subscribe to a program service provided by network 105. Network 105 may provide access to and use of programs according to various other services, such as a streaming service, a download service, a mobile service, a television service, an Internet service, or some combination thereof. The program service of network 105 may be accessed and used by users via multiple service providers. For example, a user may use different service providers because of the user's location, service being used, or both. In this way, the program service of network 105 provides an anytime and anywhere virtual disk service.

Network devices 110 include network devices that provide, for example, user interfaces, authentication and/or authorization, and access to and use of programs by users via user devices 150. One or multiple network devices 110 may be implemented as an application server device, a web server device, or the like. Network 105 may be implemented as a cloud service.

User device 150 includes a device having communicative capabilities. For example, user device 150 may be implemented as a smartphone, a tablet device, a netbook, a laptop computer, a desktop computer, a game system, or the like. User device 150 may be implemented as another type of device, such as, for example, a smart television, a set top box and a television, a vehicular communication system, etc.

According to an exemplary embodiment, user device 150 includes a multimedia system component. For example, user device 150 may include an agent or a client. According to an exemplary embodiment, the multimedia system component provides communication to other user devices 150 and network 105. According to an exemplary embodiment, the multimedia system component manages connection to network 105, storage and retrieval of program session information, provides user interfaces, and other functions, as described herein.

FIG. 1B is a diagram illustrating exemplary elements (e.g., logic) for the devices illustrated in FIG. 1A. As illustrated, network 105 includes a user interface (UI) device 110-1, a program storage device 110-2, and a delivery device 110-3. User devices 150 include a mobile device 150-1 and a display device 150-2.

UI device 110-1 includes a network device that provides access to the program service provided by network 105. For example, UI device 110-1 provides interfaces to allow a user to sign-on to the program service and manage user settings.

Program storage device 110-2 includes a network device that stores programs. Program storage device 110-2 provides interfaces to allow a user to select programs. Delivery device 110-3 includes a network device that delivers programs to user devices 150. For example, delivery device 110-3 may include a streaming server device. According to another implementation, delivery device 110-3 includes a network device that facilitates the delivery of programs to user devices 150. For example, delivery device 110-3 may interface with other network devices belonging to other networks (e.g., television network, mobile network, etc.) to provide the delivery of programs to users.

Mobile device 150-1 includes a smartphone or the like. Mobile device 150-1 includes an agent or a client that provides various functions, as described herein. Display device 150-2 includes a television or a tablet device. Display device 150-2 includes an agent or a client that provides various functions, as described herein. The agents of mobile device 150-1 and display device 150-2 may communicate with each via a wireless standard (e.g., Bluetooth, WiFi, Ultra Wide Band, or the like).

Referring to FIG. 1B, according to an exemplary scenario, assume a user is carrying mobile device 150-1 and mobile device 150-1 is turned on. Also assume that the user wishes to watch a movie on display device 150-2. The user turns on display device 150-2. According to this example, the multimedia system agents of mobile device 150-1 and display device 150-2 establish a wireless connection with each other. For example, the multimedia system agent of mobile device 150-1 scans and detects the multimedia system agent of display device 150-2. In response, mobile device 150-1 transmits a login in message to UI device 110-1. The log-in message includes the user identifier. UI device 110-1 validates the user identifier based on account information associated with subscribers of the program service. Upon a successful login, the multimedia system agent of display device 150-2 displays a user interface that prompts the user whether the user would like to select a program. The user accepts the invitation. According to an exemplary implementation, an accept message is transmitted to UI device 110-1 via mobile device 150-1, via a home router, via the user's television service connection, or via some other network connection.

Program storage device 110-2 provides a user interface to allow the user to select a program. For example, UI device 110-1 communicates with program storage device 110-2 to indicate that the user is logged-in or authorized to use the program service. The user selects a program and the program is delivered to display device 150-2 via delivery device 110-3. For this example, assume that the user only watches a portion of the movie. After stopping the movie, the multimedia system agent of display device 150-2 displays a user interface that prompts the user whether the user would like to save the program session. The user indicates that the program session should be saved. According to other implementations, the multimedia system agent of display device 150-2 may operate according to other user settings pertaining to program sessions. For example, as previously described, the program session may be automatically saved, not saved, no prompting, etc. As previously described, the program session information may be saved in various formats. For example, the user may save the previous session based on the location of the user (e.g., at home, at work, on-the-go, etc.), the time of day and/or calendar information (e.g., day of week, month, year, etc.), the user device used during the session (e.g., home television, my laptop, my tablet, etc.) the type of program (e.g., movies, games, music, etc.), the program service provider (e.g., television service provider, Internet service provider, company A, company B, etc.), the format of the program (e.g., Blu-ray, 3-D, HD, etc.), or some combination thereof. According to an exemplary implementation, the program session information includes a program identifier that uniquely identifies the program.

According to an exemplary implementation, the program session information may be stored on mobile device 150-1. Additionally, or alternatively, the program session information may be stored on display device 150-2 or within network 105 (e.g., UI device 110-1).

The next day, assume that the user travels to the airport to make a trip to Chicago. The user is carrying mobile device 150-1. According to this example, assume that network 105 stores the program session information pertaining to the movie. While on the airplane and before mobile device 150-1 is turned off, the user turns on display device 150-2 (e.g., an onboard display device) located on the seat in front of the user. Mobile device 150-1 establishes a wireless connection with display device 150-2. Similar to the previous session, mobile device 150-1 automatically logs-in the user with UI device 110-1. According to another implementation, if the user's mobile device 150-1 is turned off or the user does not have a mobile device 150-1, the user may be prompted to provide the user identifier or the user identifier and a password to log-in with UI device 110-1 via display device 150-2.

Display device 150-2 displays a user interface indicating that the user has a saved program. The user interface includes a listing of saved program sessions. The program sessions are categorized according to the user settings (e.g., by location, by type of program, etc.). The user selects, via the user interface, program session information stored according to location. The user indicates, via the user interface, to continue playing the movie. After the movie is over, assume that the user wishes to watch a live television news program. The user begins watching the news program. In the middle of the news program, the airplane begins to land and the user is told to turn-off display device 150-2. Upon landing at Chicago, the user turns on mobile device 150-1 and UI device 110-1 stores program session information on mobile device 150-1.

After leaving the airport, the user checks in to a hotel. While the user is in the hotel room, the user turns on display device 150-2 (e.g., a television). The television service is from a network dish television service provider. Mobile device 150-1 automatically logs-in the user and display device 150-2 displays a user interface that indicates program session information pertaining to the news program. The user elects to continue watching the news program.

According to an exemplary embodiment, display device 150-2 detects multiple mobile devices 150. For example, referring to FIG. 2, assume that two users of the program service are close to display device 150-2. Each of the multimedia system agents of mobile device 150-1 and mobile device 150-3 communicates with the multimedia system agent of display device 150-2. According to an exemplary embodiment, based on the detection of mobile device 150-1 and mobile device 150-3, display device 150-2 provides a user interface that requests a selection of a user identifier. For example, the user interface may list two user identifiers. According to another exemplary embodiment, display device 150-2 selects the user identifier to provide the program service based on signal strength. For example, the multimedia system agent of display device 150-2 measures the signal strength of each communication with mobile device 150-1 and mobile device 150-3. The communication with the strongest signal is selected for purposes of providing the program service.

Figure 3:
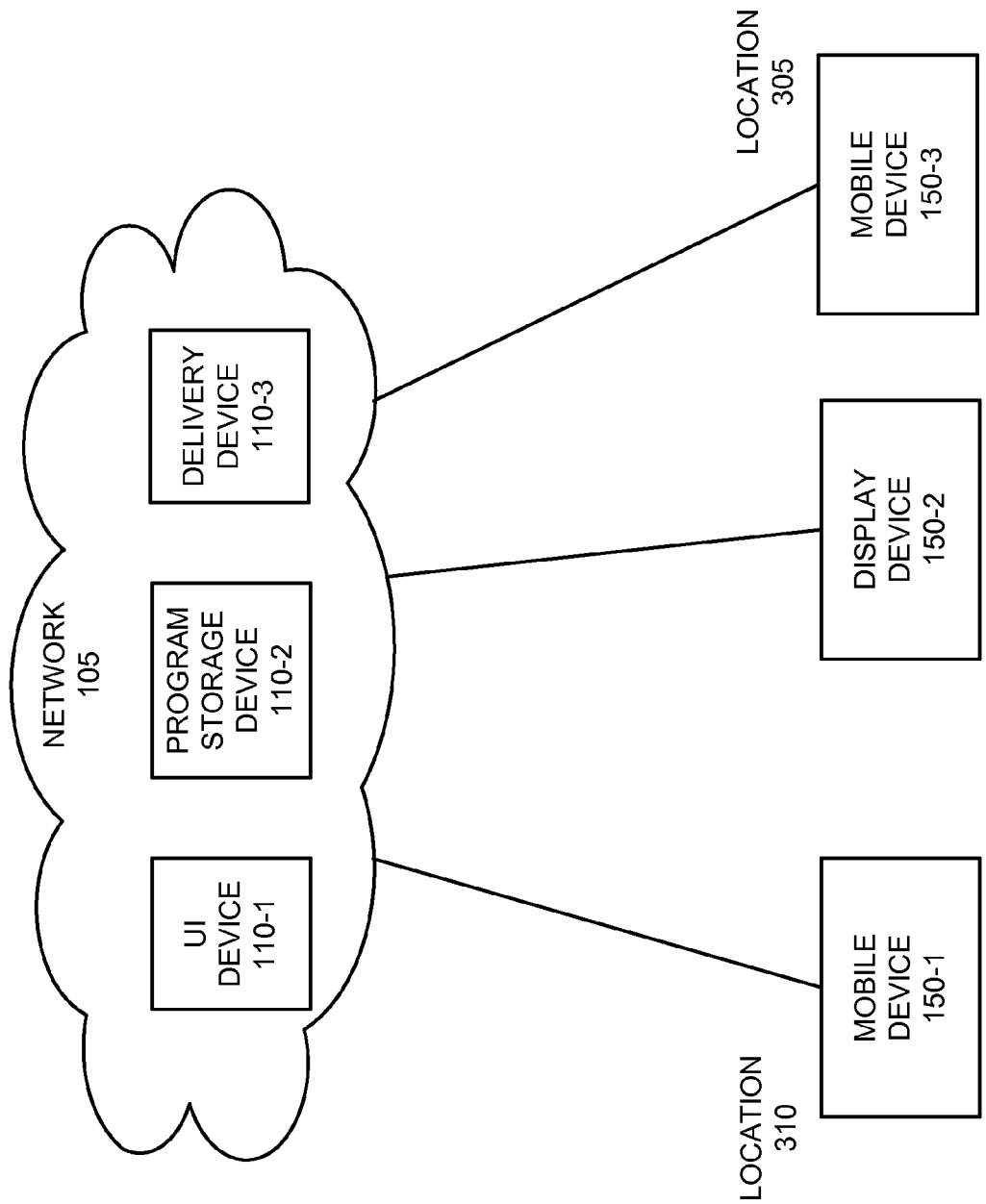
FIG. 3 is a diagram illustrating the multimedia system in accordance with another exemplary scenario.

As previously described, according to an exemplary embodiment, the multimedia system allows a user to share a session with another user. Referring to FIG. 3 and continuing with the exemplary scenario described, assume the user is still in Chicago (e.g., location 305) on a business trip. Additionally, assume the user's daughter is also a user of the multimedia system and is located in Boston (e.g., location 310). According to this scenario, the user's daughter is watching a documentary on her mobile device 150-1 (e.g., a tablet device) for a school project. During the viewing, the user's daughter doesn't understand a section in the documentary. The user's daughter sends an e-mail or a text message to her mother seeking assistance.

According to an exemplary implementation, the e-mail or the text message includes the user identifier of the daughter.

According to another implementation, the multimedia system agent of mobile device 150-1 includes a user interface for allowing a user to communicate with other users and share program session information, a selection of a program, a program review, etc. In either case, the user receives the e-mail or the text message from her daughter. According to this example, in response to receiving the text message or the e-mail, the user accesses and views the documentary based on the user identifier of the user's daughter. For example, mobile device 150-3 or display device 150-2 communicates with UI device 110-1. One message may include the user identifier of the daughter and an authorization token that authorizes the user to access the program session information pertaining to the documentary. UI device 110-1 stores the program session information. Display device 150-1 begins to display the documentary beginning at a timestamp included in the program session information.

Figure 4:
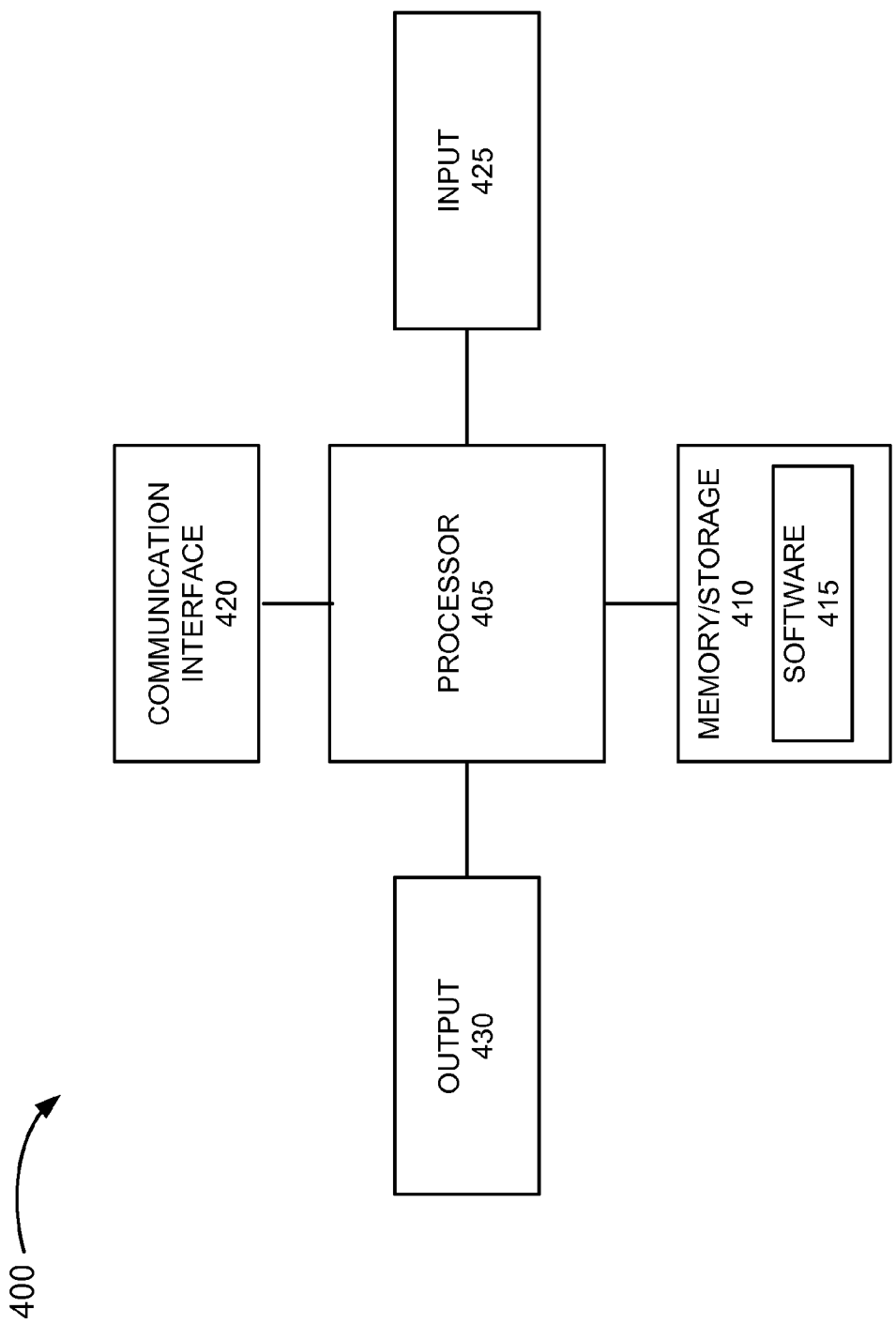
FIG. 4 is a diagram illustrating exemplary components of a device that may correspond to one or more of the devices previously depicted.

FIG. 4 is a diagram illustrating exemplary components of a device 400 that may correspond to one or more of the devices depicted in the previous figures. As illustrated, according to an exemplary embodiment, device 400 includes a processor 405, memory/storage 410, software 415, a communication interface 420, an input 425, and an output 430. According to other embodiments, device 400 may include fewer components, additional components, different components, and/or a different arrangement of components than those illustrated in FIG. 4 and described herein.

Processor 405 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 includes an application or a program that provides a function and/or a process. Software 415 may include firmware. For example, network devices 110 may be implemented with one or more program(s) and/or application (s). Additionally, for example, with reference to user device 150, one or more program(s) and/or application(s) may be used to display user interfaces, communicate with network 105, communicate with other user devices 150, etc.

Communication interface 420 permits device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 permits an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 permits an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.).

Figure 5A:
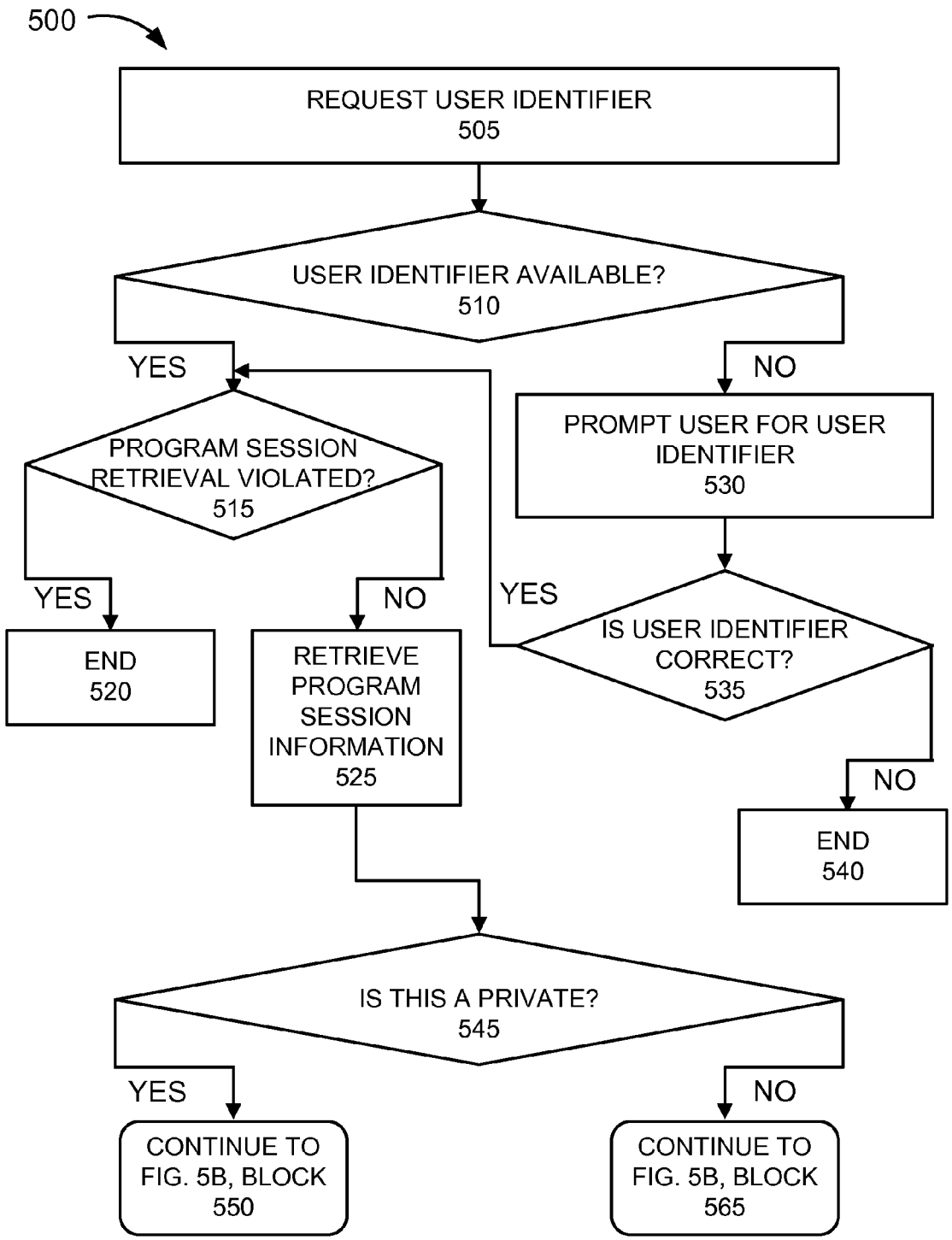
FIGS. 5A-5C are flow diagrams illustrating an exemplary process pertaining to an exemplary embodiment of the multimedia system.
Figure 5B:
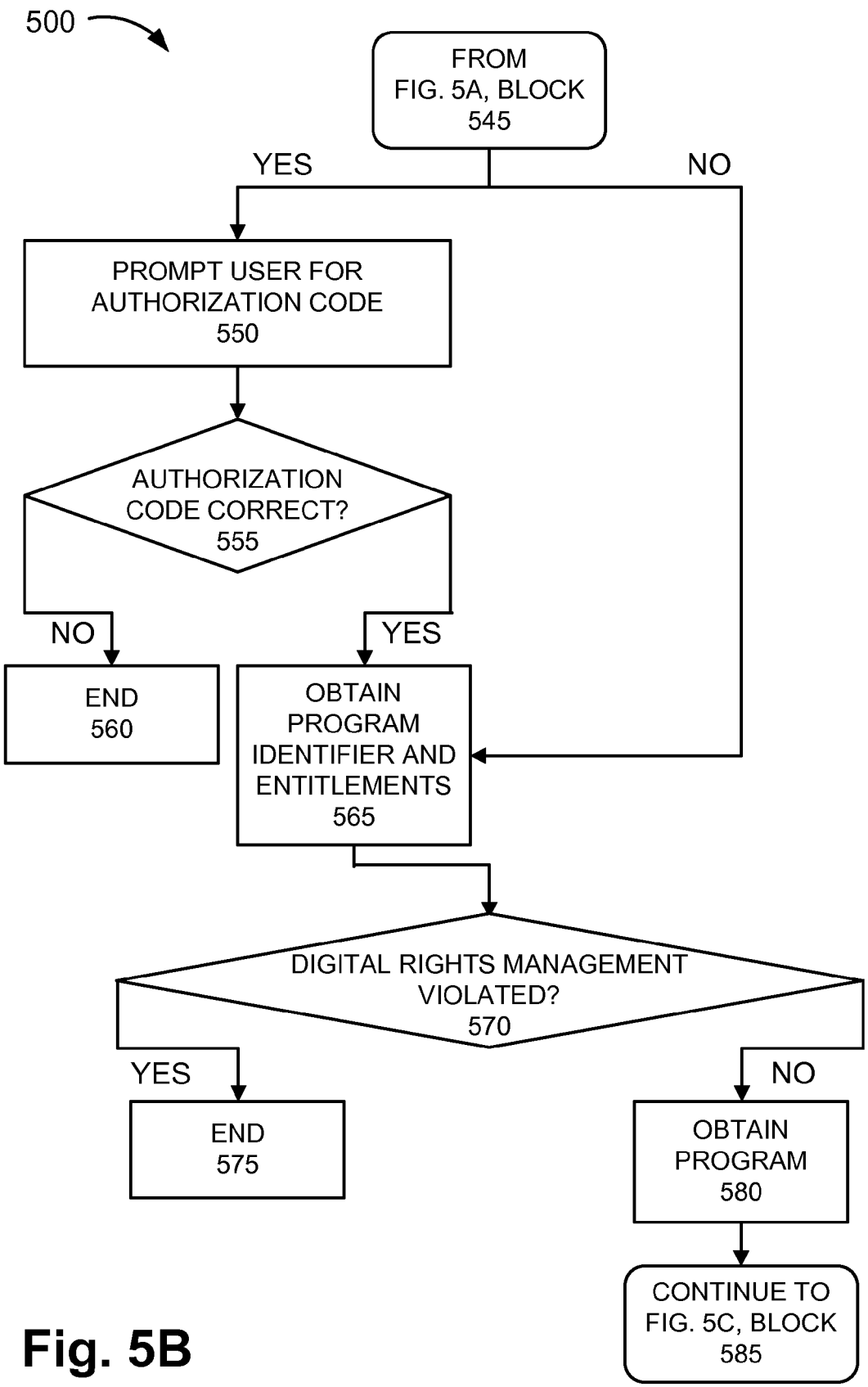
Figure 5C:
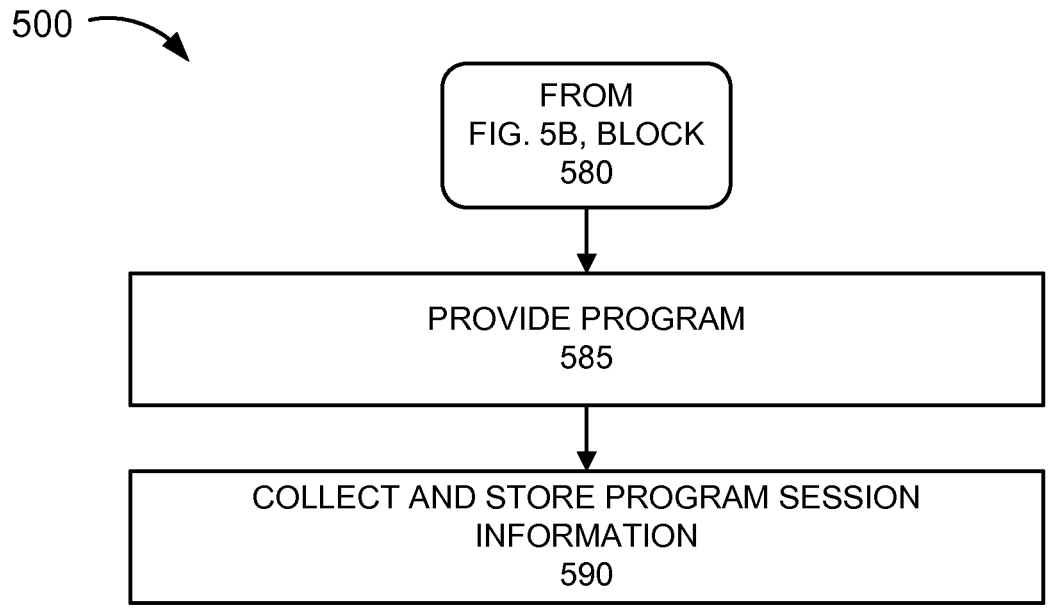

FIG. 5A-5C are flow diagrams illustrating an exemplary process 500 pertaining to an exemplary embodiment of the multimedia system. For example, process 500 pertains to providing universal program session shifting. A step described in process 500 is performed by one or more of the devices illustrated in FIG. 1A. For example, processor 405 of network device 110 may execute software 415 to perform a step described. It may be assumed that a connection between network 105 and user device 150 exists.

Process 500 begins with requesting a user identifier (block 505). For example, network 105 (e.g., UI device 110-1) requests a user identifier from the multimedia system agent of user device 150 during a logging-in procedure.

In block 510, it is determined whether the user identifier is available. For example, in response to the request, the multimedia system agent of user device 150 attempts to retrieve the user identifier. According to an exemplary implementation, depending on user device 150, the multimedia system agent of user device 150 may not store the user identifier. For example, the multimedia system agent of a television may not store the user identifier. Additionally, or alternatively, the multimedia system agent of another user device 150 (e.g., a mobile device), which may be used in combination with a viewing user device 150 (e.g., the television), may not be turned on or proximate to the user or the viewing user device 150.

According to other implementations, the multimedia system agent of user device 150 attempts to retrieve the user identifier for logging-in with network 105. According to this implementation, it is determined whether the user identifier is available. Similar to that previously described, according to an exemplary implementation, the multimedia system agent of user device 150 may not store the user identifier or the multimedia system agent of user device 150 may not be turned on or proximate to the user or the viewing user device 150.

If it is determined that the user identifier is available (block 510-YES), then it is determined whether program session retrieval is a violation (block 515). For example, the multimedia system agent of user device 150 provides the user identifier to network 105. Additionally, network 105 (e.g., UI device 110-1) determines whether program session retrieval is permitted. For example, some programs may have a time limit or access restriction. By way of further example, a user may rent the program which allows the user to view the program within a limited time period.

If it is determined that program session retrieval is a violation (block 515-YES), then process 500 ends (block 520). For example, network 105 (e.g., UI device 110-1) prevents the user from accessing the program. Network 105 may cause a user interface to be displayed on user device 150 informing the user that access is denied.

If it is determined that program session retrieval is not a violation (block 515-NO), then program session information is retrieved (block 525). For example, network 105 (e.g., UI device 110-1) retrieves stored program session information. According to an exemplary implementation, network 105 stores program session information. According to another exemplary implementation, user device 150 stores the program session information. User device 150 may provide the program session information to network 105.

Returning to block 510, if it is determined that the user identifier is not available (block 510-NO), then the user is prompted to provide the user identifier (block 530). For example, network 105 (e.g., UI device 110-1) causes a user interface to be displayed that prompts the user to provide the user identifier. Alternatively, the multimedia system agent of user device 150 provides a user interface that prompts the user to provide the user identifier, in response to a determination that the user identifier is not available.

In block 535, it is determined whether the user identifier is valid. For example, the user enters a user identifier, via the user interface. Network 105 (e.g., UI device 110-1) receives the user identifier and compares the user identifier to a stored user identifier to determine whether the user identifier is valid. If it is determined that the user identifier is valid (block 535-YES), the process 500 continues to block 515, otherwise process 500 ends at block 540. For example, network 105 (e.g., UI device 110-1) prevents the user from accessing the program. Network 105 may cause a user interface to be displayed on user device 150 informing the user that access is denied.

In block 545, it is determined whether the program session information is private. For example, program session information may be private or shared with other users. By way of further example, a user may wish that program session information not be shared with other members of his/her family. Alternatively, the user may wish that program session information is shared. According to an exemplary implementation, user settings or preferences may be stored pertaining to the privacy/sharing of program session information. The user setting may be a global setting or on a per-program basis. For example, network 105 (e.g., UI device 110-1) may store a privacy or sharing attribute pertaining to program session information. Based on this information, network 105 determines whether the program session is private.

If it is determined that the program session information is private (block 545-YES), then a prompt for an authorization code is provided (block 550), as illustrated in FIG. 5B. For example, network 105 (e.g., UI device 110-1) causes a user interface to prompt the user for an authorization code. Alternatively, the multimedia system agent of user device 150 provides a user interface. Referring to FIG. 5A, if it is determined that the program session information is not private (block 545-NO), then process continues to block 565, as illustrated in FIG. 5B, as described further below.

In block 555, it is determined whether the authorization code is correct. For example, network 105 (e.g., UI device 110-1) compares the authorization code to a stored authorization code. If it is determined that the authorization code is not correct (block 555-NO), the process 500 ends at block 560. For example, network 105 (e.g., UI device 110-1) prevents the user from accessing the program. Network 105 may cause a user interface to be displayed on user device 150 informing the user that access is denied.

If it is determined that the authorization code is correct (block 555-YES), then the program identifier and entitlement information is obtained (block 565). For example, network 105 (e.g., UI device 110-1) obtains the program identifier included in the program session information. Additionally, network 105 obtains entitlement information pertaining to the program. For example, the entitlement information includes digital rights information.

In block 570, it is determined whether there is a digital rights management violation. For example, network 105 (e.g., UI device 110-1) determines whether there is a digital rights management violation based on the entitlement information. For example, the digital rights include copyright, licensing, copying, or some combination thereof.

If it is determined that there is a digital rights management violation (block 570-YES), then process 500 ends at block 575. For example, network 105 (e.g., UI device 110-1) prevents the user from accessing the program. Network 105 may cause a user interface to be displayed on user device 150 informing the user that access is denied.

If it is determined that there is not a digital rights management violation (block 570-NO), then the program is obtained (block 580). For example, network 105 retrieves the program based on the program identifier. According to an exemplary implementation, UI device 110-1 provides the program identifier to program storage device 110-2 or delivery device 110-3.

Referring to FIG. 5C, in block 585, the program is provided. For example, network 105 selects the program and provides the program to user device 150. According to an exemplary implementation, delivery device 110-3 retrieves the program from program storage device 110-2 and provides the program to user device 150.

In block 590, program session information is collected and stored. For example, network 105 (e.g., delivery device 110-3) collects and stores program session information. For example, if the program is a movie, network 105 collects and stores session events (e.g., play, stop, rewind, etc.) pertaining to the viewing of the movie. Alternatively, the multimedia system agent of user device 150 collects and stores program session information.

Although FIGS. 5A-5C illustrate an exemplary process 500 for providing universal program session shifting, according to other implementations, process 500 may include additional operations, fewer operations, and/or different operations than those illustrated in FIGS. 5A-5C and described herein.

Figure 6:
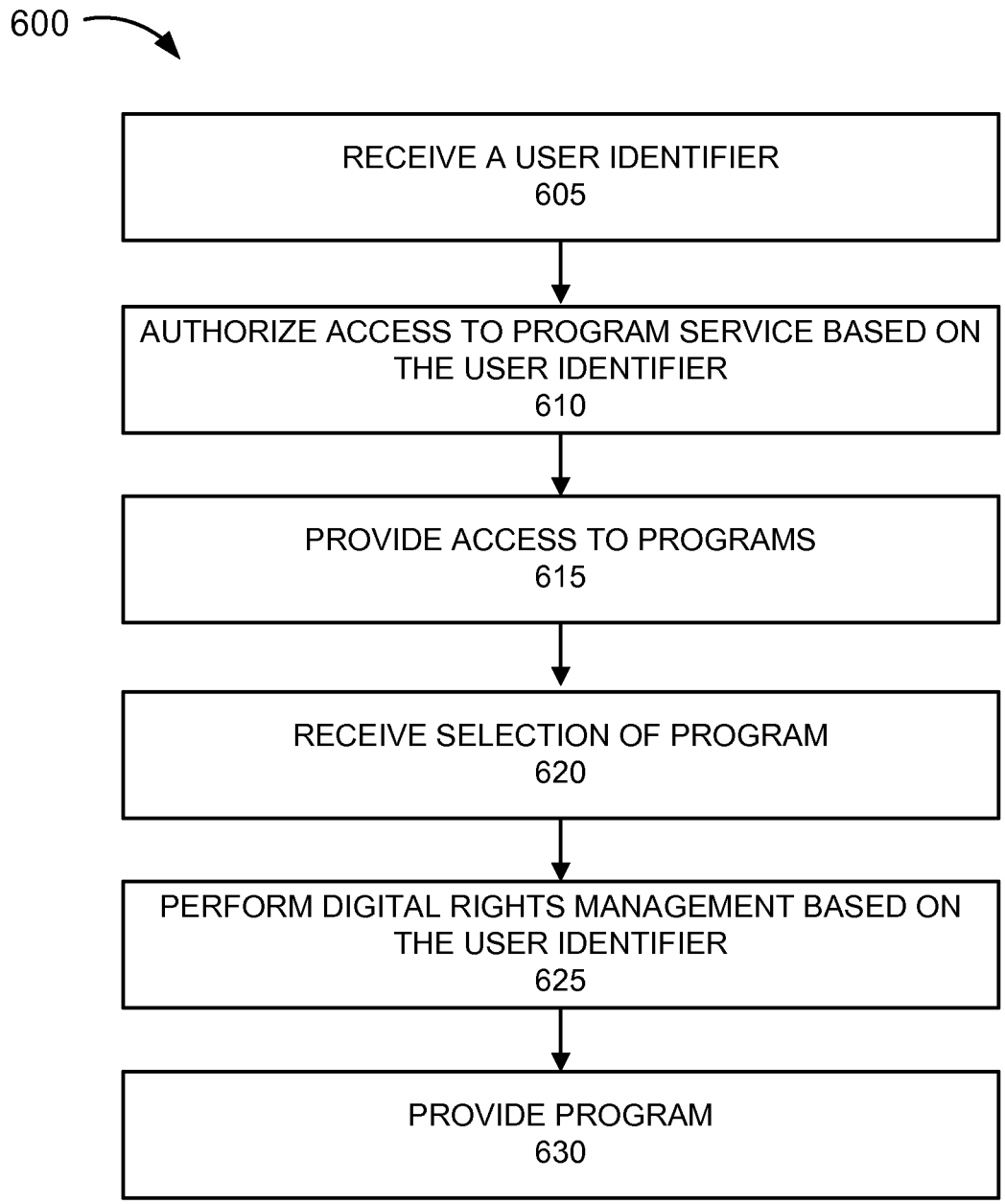
FIG. 6 is a flow diagram illustrating an exemplary process pertaining to an exemplary embodiment of the multimedia system.

FIG. 6 is a flow diagram illustrating an exemplary process 600 pertaining to an exemplary embodiment of the multimedia system. For example, process 600 pertains to providing a program service at an individual level based on the user identifier. A step described in process 600 is performed by one or more of the devices illustrated in FIG. 1A. For example, processor 405 of network device 110 may execute software 415 to perform the step described, processor 405 of user device 150 may execute software 415 to perform the step described, or some combination thereof.

Process 600 begins with receiving a user identifier (block 605). For example, the multimedia system agent of user device 150 receives a user-initiated (e.g., physical contact between two user devices, auditory command, pressing a button, executing the multimedia system agent via an icon, etc.) log-in request or an automatic network-initiated (e.g., based on the detection of another multimedia system agent, etc.) log-in request is performed. As previously described, the multimedia system agent of user device 150 transmits a log-in request that includes the user identifier. The connection to network 105 depends on the user device 150 being used. For example, user device 150 may access network 105 via a mobile network. Alternatively, user device 150 may access network 105 via an Internet connection or other suitable network connection. According to an exemplary implementation, in the case of two user devices 150 being used (e.g., a mobile device and a display device), the mobile device may act as a proxy for logging-in the display device by using the user identifier associated with the mobile device. Network 105 (e.g., UI device 110-1) receives the log-in request.

In block 610, access to the program service is authorized based on the user identifier. For example, network 105 (e.g., UI device 110-1) validates the user identifier based on account information of users subscribed to the program service. According to this example, it may be assumed that the user identifier is valid.

In block 615, access to the program service is provided. For example, network 105 provides access to programs. For example, program storage device 110-2 provides various user interfaces that allow the user to navigate and select a program.

In block 620, a selection of a program is received. For example, user device 150 receives a user selection of a program. The user selection is transmitted to program storage device 110-2.

In block 625, digital rights management is performed based on the user identifier. For example, network 105 receives a license request from user device 150. According to an exemplary implementation, the license request includes the user identifier and the program identifier. Network 105 (e.g., a license server or an entitlement database) is queried to check entitlements of the user to determine whether the user is entitled to consume the program. In this example, it may be assumed that the user is entitled to consume the program. Network 105 transmits a license response to user device 150. According to an exemplary implementation, the license response includes a license (e.g., entitlement information) to receive the program.

In contrast to other approaches in which program providers use an account-based identification and limit the number of registered devices to consume programs (e.g., to prevent access to programs stemming from one account being shared by friends, relatives, etc.), according to an exemplary embodiment, the entitlement/license is validated at an individual level.

In block 630, the program is provided. For example, delivery device 110-3 provides the selected program to the user, via user device 150.

Although FIG. 6 illustrates an exemplary process 600 for providing a program service at an individual level, according to other implementations, process 600 may include additional operations, fewer operations, and/or different operations than those illustrated in FIG. 6 and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5A-5C, and 6, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and hardware. For example, a process or a function may be implemented as "logic" or as a "component." This logic or this component may include hardware (e.g., processor 405, etc.) or a combination of hardware and software (e.g., software 415). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 410. The data and/or information may be executed to perform processes or provide functions, as described herein.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
   receiving, by a network device, log-in information to access a program service, wherein the log-in information includes a user identifier that uniquely identifies a user of a mobile device, and wherein the program service provides access to and use of programs that include multimedia content, wherein the multimedia content includes movies;
   authorizing, by the network device, access to the program service at a user level based on the user identifier;
   providing, by the network device, access to programs based on the authorizing;
   receiving, by the network device, a selection of a program;
   providing, by the network device, the program;
   collecting, by the network device, during the providing of the program, program session information pertaining to a consumption of the program by the user, wherein the consumption includes at least one of a viewing of or a listening to the program by the user;
   storing, by the network device, the program session information;
   providing, by the network device, a user interface that allows the user to store user settings, wherein the user settings include a user setting that indicates the program session information is private, and a user setting that indicates the program session information is not private;
   storing, by the network device, one of the user settings, which is specified by the user via the user interface;
   storing other program session information based on another user setting, wherein the other user setting indicates to store the other program session information based on at least one of a user location, a user device with which the user previously had a program session pertaining to another one of the programs, a type of program, or information indicating a service provider that the user uses to access the program service; and
   providing a user interface that allows the user to select the other program session information based on the other user setting.

2. The method of claim 1, wherein the user identifier includes a unique identifier of the mobile device and the user does not complete the consumption of the program, and the method further comprising:
   receiving a request to access the program service;
   prompting the user for the user identifier; and
   determining whether program session retrieval is violated in response to validating the user identifier.

3. The method of claim 2, further comprising:
   retrieving the program session information pertaining to the program;
   determining whether the program session information is private based on the user setting;
   requesting an authorization code in response to determining that the program session information is private; and
   verifying whether the authorization code is valid.

4. The method of claim 1, further comprising:
   performing digital rights management verification at the user level based on the user identifier, and wherein when the user setting indicates that the program session information is private, the program session information is not accessible by another user that shares a same account of the program service with the user unless the other user receives authorization from the user.

5. The method of claim 1, further comprising:
   receiving a request to view the program subsequent to providing the program;
   determining whether program session retrieval is violated based on a time limitation for viewing the program; and
   preventing the user from viewing the program in response to determining that the time limitation for viewing the program is violated.

6. A method comprising:
   detecting, by a mobile device, a presence of a multimedia component operating on another user device, wherein the multimedia component provides access to and use of a program service, and wherein the program service provides access to and use of programs that include multimedia content, and wherein the multimedia content includes movies, games, music, and photos;
   establishing, by the mobile device, a connection between a multimedia component operating on the mobile device and the multimedia component operating on the other user device; and
   transmitting, by the mobile device, log-in information, via the connection, to access the program service on behalf of the other user device, wherein the log-in information includes a user identifier that uniquely identifies a user of the mobile device, wherein the user identifier includes a telephone number of the mobile device, and the method further comprising:
   detecting, by the other user device, a presence of mobile devices including the mobile device;
   measuring, by the other user device, signal strengths pertaining to each of the mobile devices;
   selecting, by the other user device, the log-in information from the mobile device in response to determining, based on the measuring, that a signal strength associated with the mobile device is greater than one or more other signal strengths associated with one or more other mobile devices;
   transmitting, by the other user device, the log-in information to a network device; and
   providing access to the program service for the user of the mobile device.

7. The method of claim 6, further comprising:
   receiving a program on the other user device; and
   storing, by the mobile device, program session information pertaining to the program.

8. The method of claim 6, wherein the multimedia component operating on the other user device includes a television.

9. A program system comprising:
   a communication interface;
   a memory, wherein the memory stores instructions; and
   a processor, wherein the processor is to execute the instructions to:
     receive, via the communication interface, log-in information to access a program service, wherein the log-in information includes a user identifier that uniquely identifies a user of a mobile device, and wherein the program service provides access to and use of programs that include multimedia content, wherein the multimedia content includes movies;
     authorize access to the program service at a user level based on the user identifier;

receive, via the communication interface, a selection of one of the programs;
provide, via the communication interface, the one of the programs;
collect program session information pertaining to a consumption of the one of the programs by the user during a providing of the one of the programs, wherein the consumption includes at least one of a viewing of or a listening to the one of the programs by the user;
store the program session information;
provide a user interface that allows the user to store user settings, wherein the user settings include a user setting that indicates the program session information is private, and a user setting that indicates the program session information is not private;
store one of the user settings, which is specified by the user via the user interface;
store other program session information based on another user setting, wherein the other user setting indicates to store the other program session information based on at least one of a user location, a user device with which the user previously had a program session pertaining to another one of the programs, a type of program, or information indicating a service provider that the user uses to access the program service; and
provide a user interface that allows the user to access the other program session information based on the other user setting.

10. The program system of claim 9, wherein the processor is to execute the instructions to:
perform digital rights management at the user level based on the user identifier, and wherein the user setting indicates that the program session information is not private.

11. The program system of claim 9, wherein the processor is to execute the instructions to:
receive, via the communication interface, a request to access programs; and
transmit, via the communication interface, user interfaces that provide information pertaining to programs available in the program service.

12. The program system of claim 11, wherein the processor is to execute the instructions to:
retrieve the program session information pertaining to the one of the programs, wherein the one of the programs is partially consumed by the user;
determine whether the program session information is private based on the one of the user settings;
request an authorization code in response to a determination that the program session information is private;
receive the authorization code; and
verify whether the authorization code is valid.

13. The program system of claim 9, wherein the multimedia content includes games, music, television programs, and photos, and wherein when the one of the user settings indicates that the program session information is private, the program session information is not accessible by another user that shares a same account of the program service with the user unless the other user receives authorization from the user.

14. The program system of claim 9, wherein the processor is to execute the instructions to:
receive, via the communication interface, a request from the user to log-out of the program service;
log the user out of the program service based on the request;
receive, via the communication interface, log-in information to access the program service;
authorize access to the program service;
receive, via the communication interface, a request from the user to obtain program session information pertaining to another user;
receive, via the communication interface, authorization information from the user indicating an authorization to access the program session information pertaining to the other user;
determine whether the authorization information allows the user to obtain the program session information pertaining to the other user; and
transmit, via the communication interface, the program session information to the user in response to a determination that the authorization information is valid.

15. The program system of claim 9, wherein the user identifier includes a unique identifier of the mobile device.

16. The program system of claim 9, wherein the processor is to execute the instructions to:
receive, via the communication interface, a request to view the program subsequent to providing the one of the programs;
determine whether program session retrieval is violated based on a time limitation for viewing the one of the programs; and
omit to provide the one of the programs in response to a determination that the time limitation for providing the one of the programs is violated; and
provide the one of the programs in response to a determination that the time limitation for providing the one of the programs is not violated.

17. A non-transitory storage medium storing instructions executable by a computational device, wherein the instructions comprise instructions to:
receive log-in information to access a program service, wherein the log-in information includes a user identifier that uniquely identifies a user of a mobile device, and wherein the program service provides access to and use of programs that include multimedia content, wherein the multimedia content includes movies;
authorize access to the program service at a user level based on the user identifier;
provide access to programs based on a successful authorization of the user;
receive a selection of a program;
provide the program to the user via the mobile device;
collect program session information pertaining to a consumption of the program by the user during a providing of the program to the user, wherein the consumption includes at least one of a viewing of or a listening to the program by the user;
store the program session information;
provide a user interface that allows the user to store user settings, wherein the user settings include a user setting that indicates the program session information is private, and a user setting that indicates the program session information is not private;
store one of the user settings, which is specified by the user via the user interface;
store other program session information based on another user setting, wherein the other user setting indicates to store the other program session information based on at least one of a user location, a user device with which the user previously had a program session pertaining to another one of the programs, a type of program, or information indicating a service provider that the user uses to access the program service; and provide a user interface that allows the user to select the other program session information based on the other user setting.

18. The non-transitory storage medium of claim 17, wherein the instructions comprise further instructions to:
retrieve the program session information pertaining to the program, wherein the program is partially consumed by the user;
determine whether the program session information is private based on the user setting;
request an authorization code in response to a determination that the program session information is private;
receive the authorization code; and
verify whether the authorization code is valid.

19. The non-transitory storage medium of claim 17, wherein the instructions comprise further instructions to:
perform digital rights management verification at the user level based on the user identifier.

20. The non-transitory storage medium of claim 17, wherein the multimedia content includes games, music, television programs, and photos, and wherein when the user setting indicates that the program session information is private, the program session information is not accessible by another user that shares a same account of the program service with the user unless the other user receives authorization from the user.

* * * * *